United States Patent
Kohl et al.

(10) Patent No.: US 6,430,688 B1
(45) Date of Patent: Aug. 6, 2002

(54) ARCHITECTURE FOR WEB-BASED ON-LINE-OFF-LINE DIGITAL CERTIFICATE AUTHORITY

(75) Inventors: Ulrich W. Kohl, Mountain View; Ling Elizabeth Xu, Saratoga, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,545

(22) Filed: Dec. 22, 1998

(51) Int. Cl.[7] ............................................. G06F 11/30
(52) U.S. Cl. ................... 713/156; 713/161; 713/175; 380/277; 380/278
(58) Field of Search .............................. 713/156, 161, 713/175, 182, 200, 201; 380/277, 278

(56) References Cited

U.S. PATENT DOCUMENTS

| | | | |
|---|---|---|---|
| 5,606,617 A | | 2/1997 | Brands |
| 5,671,279 A | | 9/1997 | Elgamal |
| 5,729,594 A | | 3/1998 | Klingman |
| 5,737,419 A | | 4/1998 | Ganesan |
| 5,922,074 A | * | 7/1999 | Richard et al. ............. 713/200 |
| 5,978,484 A | * | 11/1999 | Apperson et al. ............. 380/25 |
| 5,982,898 A | * | 11/1999 | Hsu et al. ..................... 380/23 |

OTHER PUBLICATIONS

Bruno, L., "Banking on Trust," Data Communications, vol. 27, No. 8, May 21, 1998, pp. 42–46, 48, and 50.

* cited by examiner

Primary Examiner—Thomas R. Peeso
(74) Attorney, Agent, or Firm—Gates & Cooper LLP (57) ABSTRACT

A method, apparatus, article of manufacture, and a memory structure for issuing digital certificates to a client is disclosed. The method comprises the steps of accepting a digital certificate request from a client in a web server, the digital certificate request comprising at least one client parameter, passing the client parameter to user exit external to the web server via an interface implemented by a servlet property file to determine if a digital certificate should be issued to the client, and transmitting the digital certificate to the client if the external processing module indicates that the digital certificate should be issued to the client. The article of manufacture comprises a data storage device tangibly embodying instructions to perform the method steps described above.

The apparatus comprises means for accepting a digital certificate request with a client parameter from a client in a web server, means for passing the client parameter to an external processing module to determine, among other things, if the digital certificate should be issued to the client, and a means for transmitting the digital certificate to the client.

21 Claims, 9 Drawing Sheets

ARCHITECTURE FOR WEB-BASED ON-LINE-OFF-LINE DIGITAL CERTIFICATE AUTHORITY

BACKGROUND OF THE INVENTION

1. Field of the Invention

The present invention relates to systems and methods for securing transmission and receipt of electronic data, and in particular to a method and system providing a web-based digital certificate authority.

2. Description of the Related Art

In recent years, the use of the internet and other electronic communication and message transfer methods have become widespread. While these communication methods have numerous advantages, they are vulnerable to unauthorized tampering. Persons transmitting electronic messages must be assured that their messages are not opened or disclosed to unauthorized persons. Further, the addressee of the electronic message should be certain of the identity of the sender and that the message was not tampered with at some point during transmission. Many methods have been developed to secure the integrity of electronic messages during transmission. Simple encryption is the most common method of securing data. Both secret key encryption such as DES (Data Encryption Standard) and public key encryption methods which use both a public and a private key are implemented.

Although public and private key encryption methods allow users to send internet and e-mail messages without concern that the message will be read by unauthorized persons or that its contents will be tampered with, key cryptographic methods alone do not protect the receiver of the message. That is, they do not allow the recipient to authenticate the validity of the public key or to validate the identity of the sender of the electronic message.

One method for validating the authenticity of a public key is the use of digital certificates. A digital certificate is a signed document attesting to the identity and public key of the person signing the message. Digital certificates prevent impersonation using a phony key pair.

Digital certificates are issued by a digital certificate authority (CA). Certificate authorities typically run in a trustworthy manner and are highly secure. Consequently, although they provide a high degree of security, they are difficult and expensive to implement, and are therefore unsuitable for widespread application, particularly where near-bulletproof security is not necessary or desired. Consider, for example, a driver's license and an auto club card. Both are analogous to a "certificate" in the sense that they certify to a certain extent that the person in possession of the card is who they say they are. The driver's license is issued by a trusted "certificate authority" (the state department of motor vehicles), and is therefore globally accepted (by the issuing CA and all instances that trust the issuing CA) as a genuine indication of the bearer's identity. The auto club card is issued by a "local" certificate authority (the auto club itself), and is not globally accepted as a genuine indication of the bearer's identity and his attributes (i.e. gold membership). However, for the auto club's purposes, it is sufficient to show that the bearer has paid for the auto club's services, and from the auto-club's perspective, is adequate to permit transactions between the bearer and the club.

Digital libraries and other vendors who could benefit from the user of digital certificates are currently faced with the choice of either using a third party CA's services or developing their own CA. Using a third party CA minimizes development costs, but does not allow the vendor to customize the CA to meet its particular requirements. Also, third party CAs generally provide much more security and overhead than is desired or needed, and at a higher cost. Vendors may develop their own CA with certificate toolkits, but the vendor must program everything on its own, and this can be a daunting and expensive task for most. What is needed is a digital certificate authority that provides a less trusted, but more easily implemented indication of identity, and one which allows for easy vendor customization. The present invention satisfies that need.

SUMMARY OF THE INVENTION

To address the requirements described above, the present invention discloses a method, apparatus, and article of manufacture for issuing digital certificates.

The method comprises the steps of accepting a digital certificate request from a client in a web server, the digital certificate request comprising at least one client parameter, passing the client parameter to a user exit external to the servlet to determine if a digital certificate should be issued to the client, and if the external processing module indicates that the digital certificate should be issued to the client, transmitting the digital certificate to the client. The article of manufacture comprises a data storage device tangibly embodying instructions to perform the method steps described above.

The apparatus comprises means for accepting a digital certificate request with client parameters from a client in a web server, means for passing the client parameter to an external processing module to determine, among other things, if the digital certificate should be issued to the client, for creating certificates, and a means for transmitting the digital certificate to the client.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
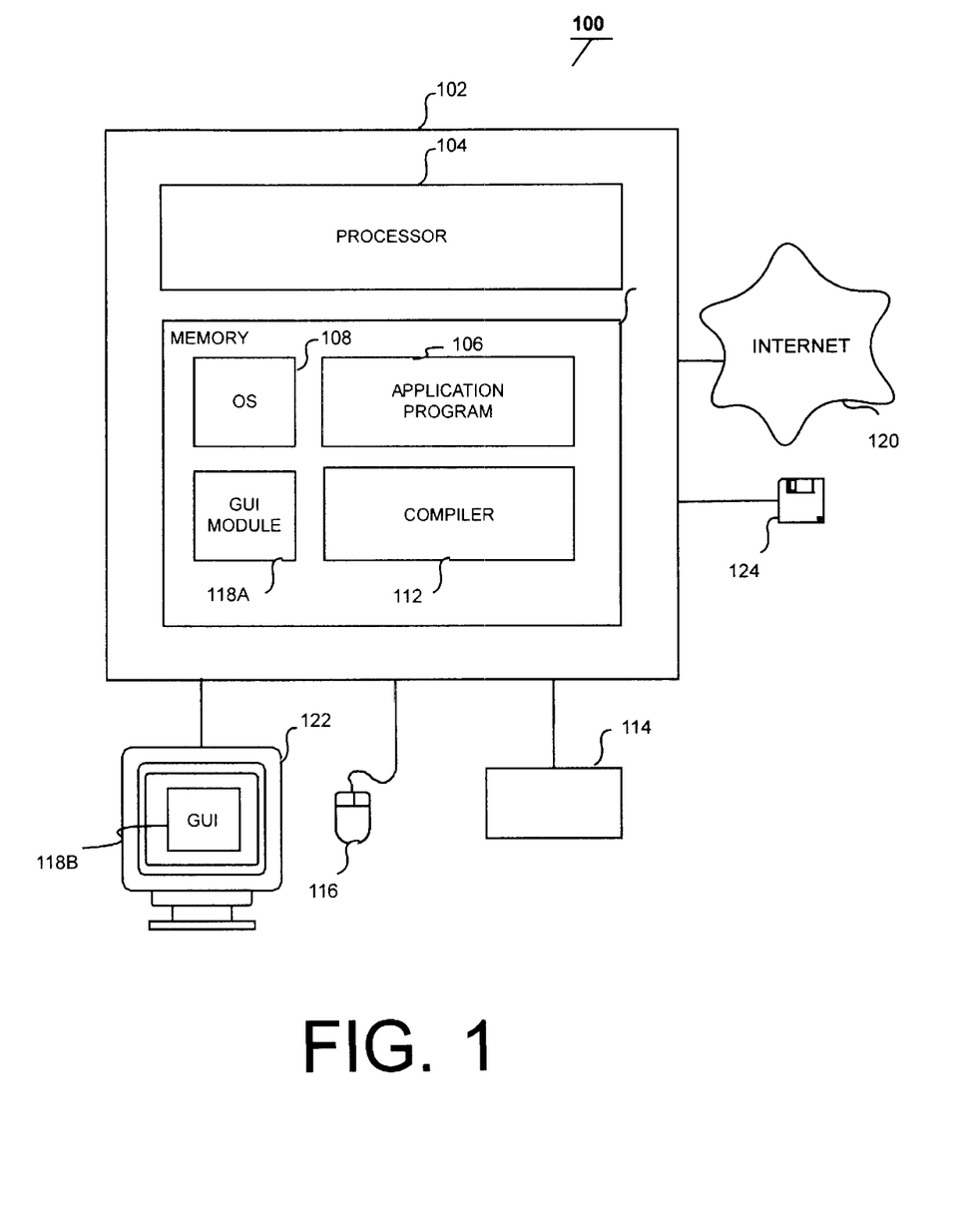
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. The computer 102 may be coupled to other computing devices via an Internet 120 or intranet connection. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, JAVA, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device 124, which could include one or more fixed or removable data storage devices, such as a zip drive, floppy disc drive, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. The application program 110 can also be a service which extends the functionality to the computer 102, e.g. a web server. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Encryption Techniques

Encryption is the most common method of securing the contents of data, whether in transport or storage. Encryption is the transformation of plaintext data into an unintelligible form known as ciphertext, and is usually accomplished by the application of mathematical algorithms on the plaintext data. These algorithms are defined by parameters known as "keys." Two common encryption methods are symmetric methods which use secret keys, and asymmetric methods which use key pairs of public and private keys.

Figure 2:
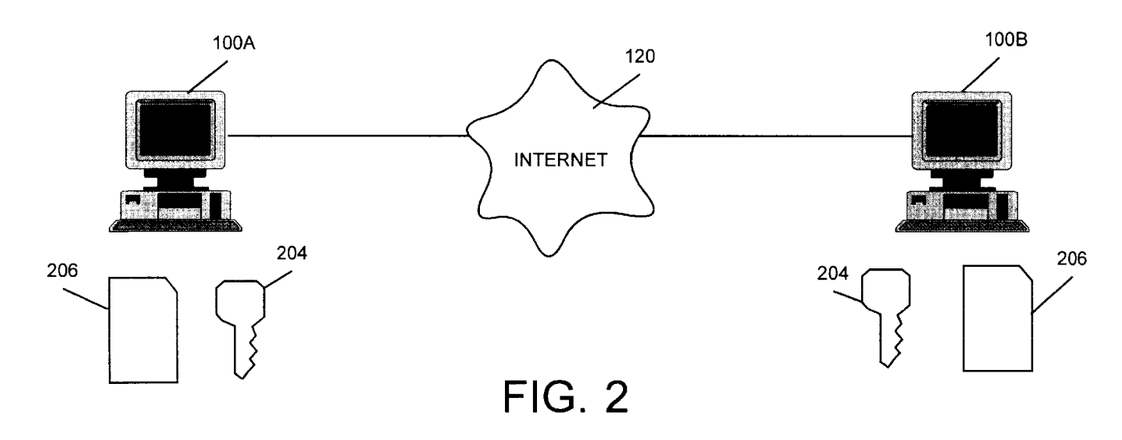
FIG. 2 is a diagram presenting an overview of private key encryption.

FIG. 2 is a diagram showing the use of secret key encryption between two communicatively coupled computers including a sending computer 100A and a receiving computer 100B. With secret key encryption, both encryption and decryption of the document or file 206 are performed using the same key 204. Both the sending computer 100A and the receiving computer 100B must know the secret key 204 in order to encrypt and decrypt data exchanged from each other. Exchanging this secret key 204 between the sending computer 100A and the receiving computer 100B can pose security risk. The Data Encryption Standard (DES) is one implementation of secret key encryption.

Figure 3:
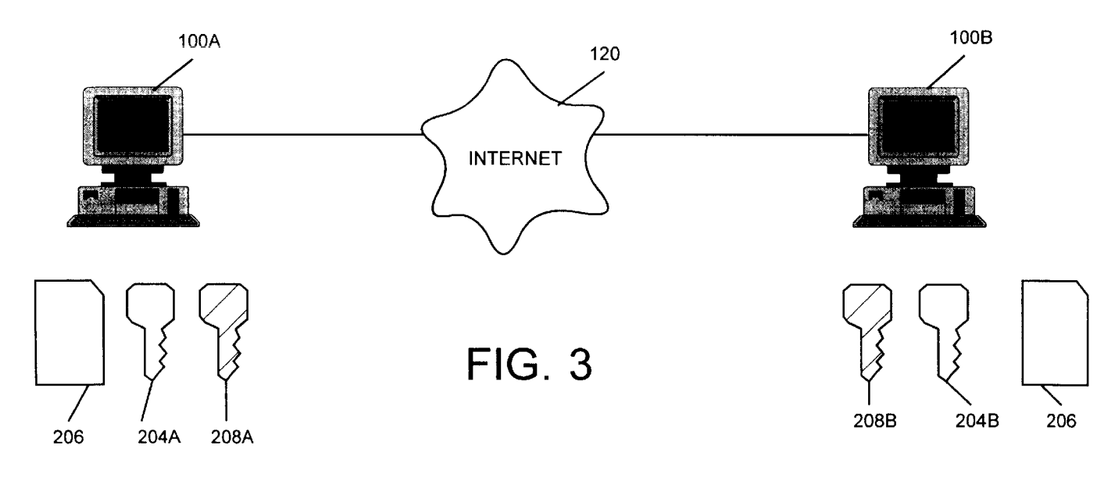
FIG. 3 is a diagram presenting an overview of public key encryption.

FIG. 3 is a diagram showing the use of public key encryption between two communicatively coupled computers including a sending computer 100A and a receiving computer 100B. Public key encryption relies on a pair of keys, a public key 208A and 208B and a private key 204A and 204B. Each user's public key 208 is published in a public key file or imbedded in certificates in an X.500 directory, while the private key 204 is kept secret. The message, file, or document 206 is encrypted using the recipient's public key 208B and sent across the insecure communications channel. The message is then decrypted by the recipient using their private key 204B.

An advantage of public key cryptography over private key cryptography is increased security, because private keys 208A and 208B need not be transmitted or revealed to anyone. Another advantage of public key cryptography is that it can provide a simple method to create digital signatures. Authentication using only private key cryptography requires the sharing of the secret key, which raises the danger of compromise or forgery.

RSA encryption, named after its M.I.T. inventors Rivest, Shamir, and Adleman, is one example of a public key encryption implementation. RSA can be used in conjunction with DES to establish and provide a secure communication connection. First the message is encrypted with a random DES key, and before being transmitted, the DES key is encrypted with the recipient's (or multiple recipients') public key(s). Both the encrypted message and the encrypted key are sent to the recipient as a digital envelope. When the envelope arrives at the destination, the recipient opens it using the associated private key to decrypt the DES key, and then decrypts the message using the newly acquired DES key. In this manner, RSA and DES are combined to gain the performance advantages of private key encryption and the key management features of RSA.

Authentication Techniques

Authentication allows for the verification that someone or something is valid or genuine. Digital signature authentication allows the receiver of the message to be confident of the identity of the sender and the integrity of the message. The digital signature is an set of data declaring that the named person wrote or otherwise agreed to the document to which the digital signature is attached. Normally, the digital signature is appended to the end of the message. A digital signature can be used for both message and sender authentication. In message authentication, the digital signature is used to verify that the received message was not tampered with, somewhat like a checksum. In sender authentication, a digital signature is used to verify the identity of the originator of a message. Thus, a secure digital signature system provides both a method of signing a document to preclude forgery, and a method of verifying that a signature was actually generated by whomever it represents. A secure digital signature cannot be repudiated; the sender cannot later disown the message by claiming it was forged.

Figure 4:
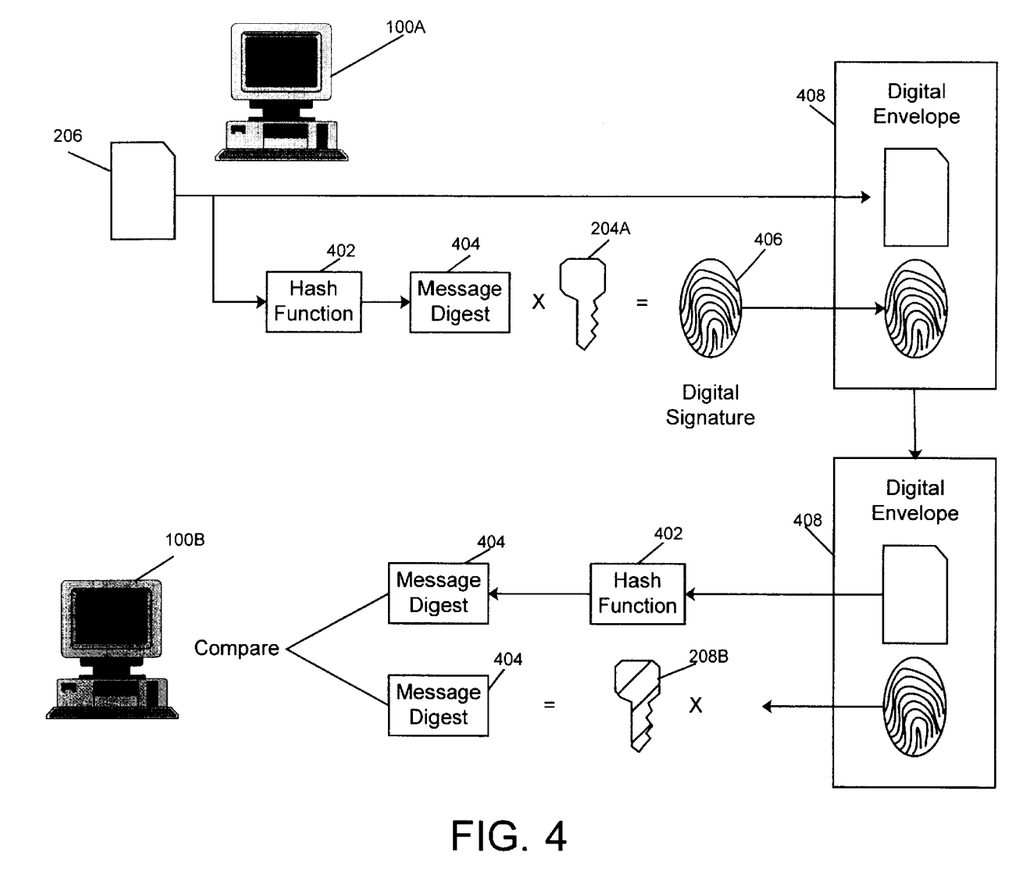
FIG. 4 is a diagram presenting an overview of digital signatures.

FIG. 4 is a block diagram showing and exemplary the digital signature process The sending computer 100A uses a one-way hash function 402 typically SHA (Secure Hash Algorithm), MD (Message Digest)2, or MD5 to scramble the message data bits. The hash function produces from a text with arbitrary length a fixed length hash value (128–160 bits). A hash function is easy to calculate and hard to reverse, i.e. it is next to impossible to find two texts with the same hash value, or a given text, another text which has the same hash value. The hash function produces a "fingerprint" or "message digest" 404. The message digest 404 is then encrypted in the sender's private key 204A, and sent along with the plaintext message 206 to the receiving computer 100B. The receiving computer 100B separates the encrypted digest from the plaintext and computes the digest 404 again on the plaintext. The encrypted digest is decrypted using the sender's public key 208B and compared against the newly created digest 404. If they match, the recipient has positively identified the sender. The message digest 404 becomes the "checksum" to validate the integrity of the data and the digital signature is the authentication that the message is from who it says it is from.

With this implementation, the sending computer's 100A private key 204A is used to create a digital signature, and the sending computer's public key 208B is used to decrypt it. On the receiving computer's 100B side, the application will automatically look up the sending computer's 100A public key 204A, decrypt the digital signature 406, and return confirmation of the source of the message.

Digital signatures can also be used to guarantee the validity of the public key. These digital signatures can be incorporated into a certificate, thereby creating a "signed" document containing a digital signature attesting to the validity and public key of the person signing the message, and preventing one user from impersonating another by using a phony key pair. Along with the public key, the certificate also contains other digital certificate attributes such as expiration date of the key, the name of the issuer of the certificate, the certificate serial number, and the digital signature of certificate issuer. However, a secure, centralized repository is required for storing and managing the keys.

Figure 5:
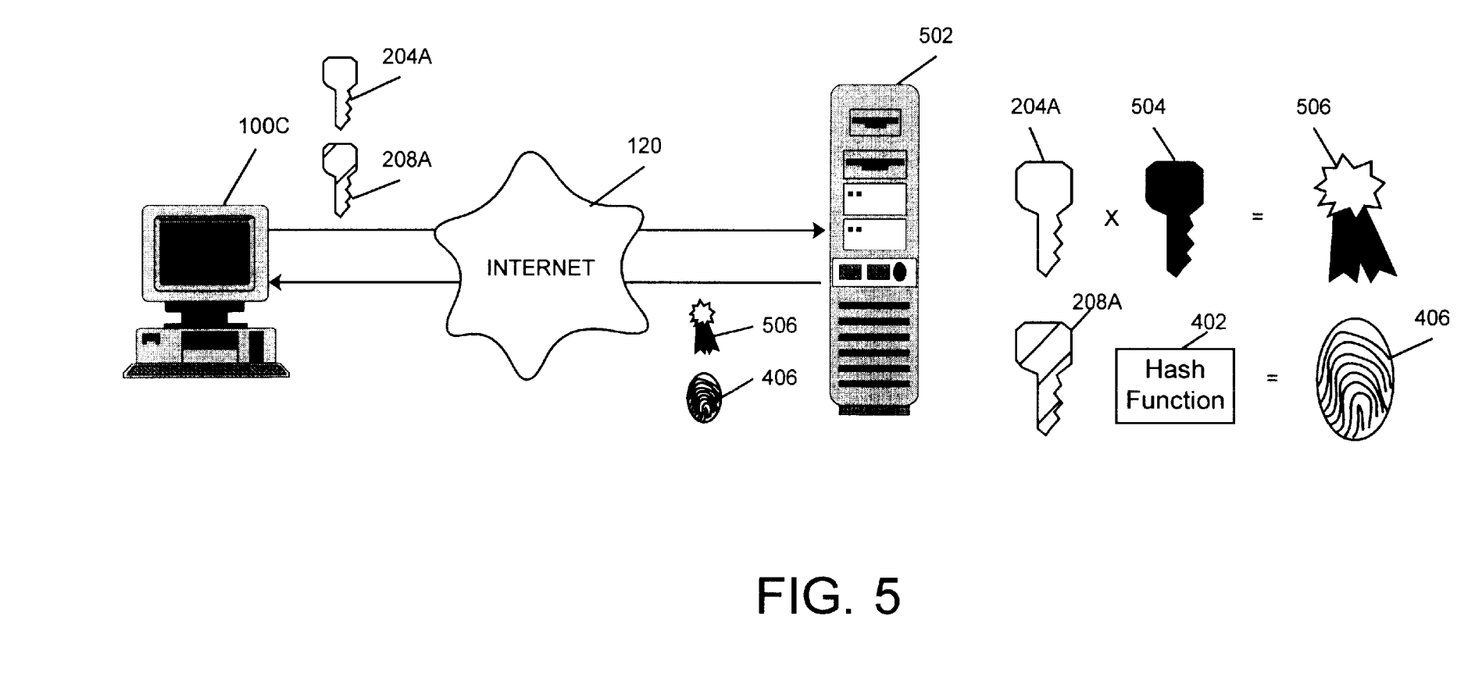
FIG. 5 is a diagram presenting an overview of digital certificates.

FIG. 5 is a diagram showing how a digital certificate may be obtained from a trusted CA. First, the requesting computer 100 sends a digital certificate request to a computer implementing the CA (hereinafter CA computer 502) via the Internet 120 or another communication medium. The digital certificate request includes the requesting computer's public key 208A. The CA computer 502 uses the requesting computer's public key 204A and the CA's private key 504 to generate a digital certificate 506. The digital certificate 506, which includes the digital signature 406 is then transmitted to the requesting computer 100.

One difficulty in the establishment of a CA is that it must begin with a root certificate that all who verify certificates from the CA and verify signatures from instances which have certificates from the CA must trust. The only way to create digital certificates that everyone can trust is to distribute a root certificate to the CA in a trustworthy way. The CA in possession of the root certificate may issue certificates to other CAs, and the validity of certificates issued by any member of the chain of CAs can be checked, so long as the root certificate is known.

Figure 6:
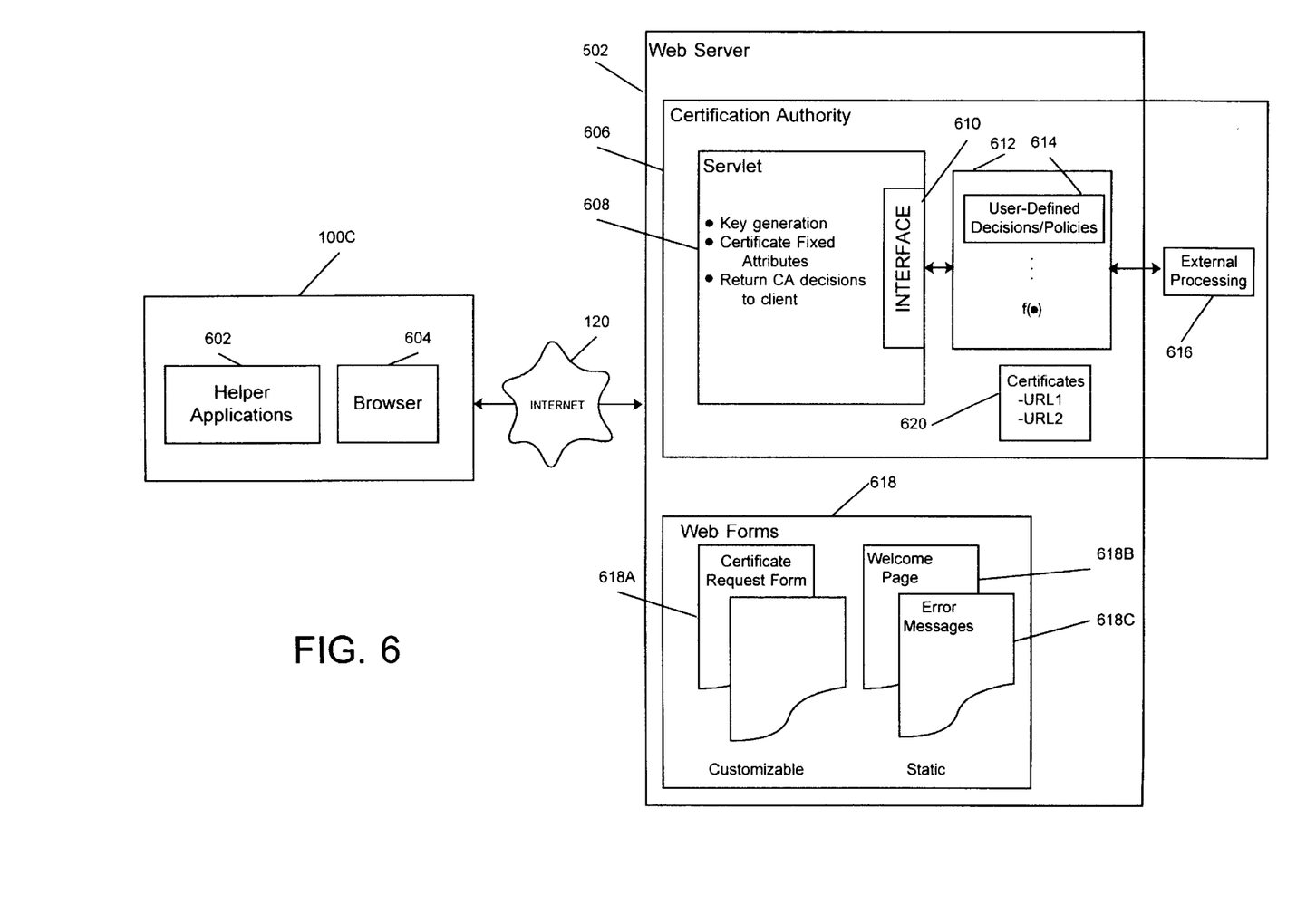
FIG. 6 is a block diagram presenting one embodiment of the digital certificate authority.

FIG. 6 is a block diagram presenting one embodiment of a digital certificate authority. A certification authority (CA) 606 is wholly implemented in a web server 502 which is accessible to a client computer 100C via the Internet 120 or similar connection. The client computer implements a browser 604 to provide Internet 120 access, and a helper application 602. The helper application 602 manages the secure storage and retrieval of key pairs. The web server 502 hosts the CA 606 and one or more web forms 618, including user-customizable forms such as a certificate request form 618A, and static forms such as welcome page 618B, and error message page 618C.

The CA 606 includes a servlet 608 or similar module implemented in the web server 502. Servlets extend a web server's functionality and can be called from remote web browsers. The servlet 608 implements a number of basic functions required to generate and distribute digital certificates, including public and private key generation, determining fixed certificate attributes, and coded program instructions for returning certificate authority decisions to the client computer 100C. The servlet 608 is supplied to the digital certificate provider, thus relieving the provider from the burden of writing and/or managing code to perform key generation (which is computationally intensive) and/or implement the communication protocol between the CA 606 and the client computer 100C (which is difficult to program and troubleshoot).

The servlet 608 also provides one or more user exits 612 via an interface, which allow the digital certificate provider to customize the operation of the certification authority 606. These user exits 612 include for example, certificate provider-defined issuance policies 614. Using the user exits 612 provided by the servlet 608, the digital certificate provider may write simple code (in Java, or a similar language) which defines when and under what circumstances the person using the client computer 100C will be issued a digital certificate. If necessary, the digital certificate provider can use the user exits 612 to pass the client computer's 100C certificate request (and any necessary parameters along with it) to external processing 616, where additional processing may be accomplished to determine whether a digital certificate will be issued to the requesting client 100C.

By way of example, suppose that the digital certificate provider is an Internet-based retail outlet, and the client would like to place an order. The client computer 100C issues a digital certificate request having the customer's credit card number. The digital certificate provider may want to verify that the credit card number is valid before issuing a certificate. In this circumstance, the user exit 612 can be used to contact a credit agency via external processing 616 to verify the credit card number. If the number is verified as genuine, the same user exit 612 can instruct the servlet 608 to begin the process of issuing a digital certificate.

Figure 7:
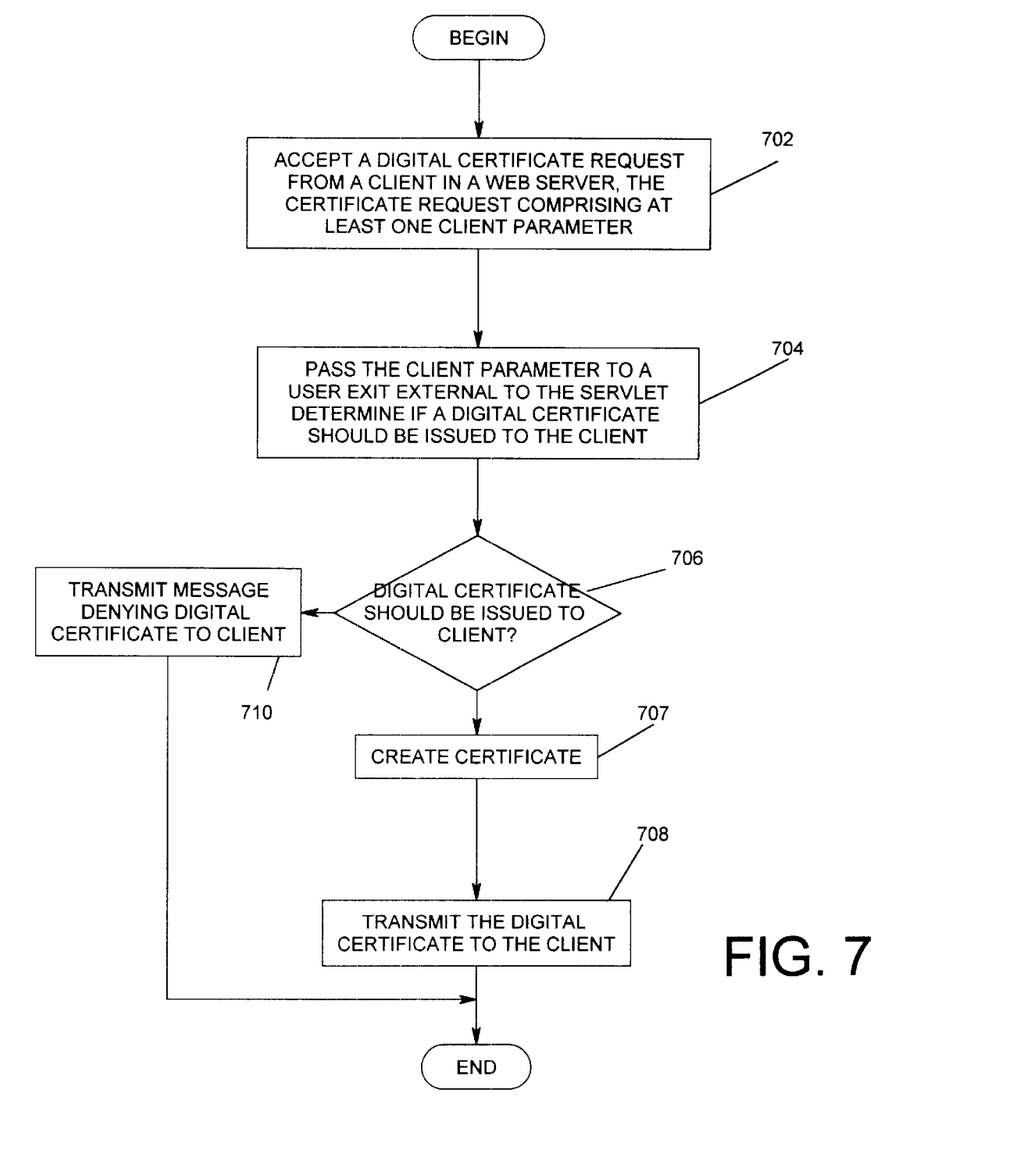
FIG. 7 is a flow chart presenting exemplary process steps used to issue a digital certificate.

FIG. 7 is a flow chart illustrating exemplary process steps used to issue a digital certificate. First, a digital certificate request from a client computer 100C is accepted in the web server 502. The digital certificate request comprises at least one client parameter, which may be a client identification number, client name and e-mail address, a client credit card, or a client password, in any combination. This is depicted in block 702. The web server 502 accepts the digital certificate request, and activates and passes the appropriate information to the servlet 608 implemented in the web server. The client parameter is then passed to a user exit 612 external to the servlet 608. This is depicted in block 704. Block 708 determines whether a digital certificate should be issued to the client. This determination is based on the client parameter information. If a digital certificate should not be issued, a message is transmitted 710 to the client 100C to that effect. If a digital certificate should be issued, the certificate is created 707 with the attributes determined by the user exit, and transmitted to the client 100C as shown in block 708.

Figure 8A:
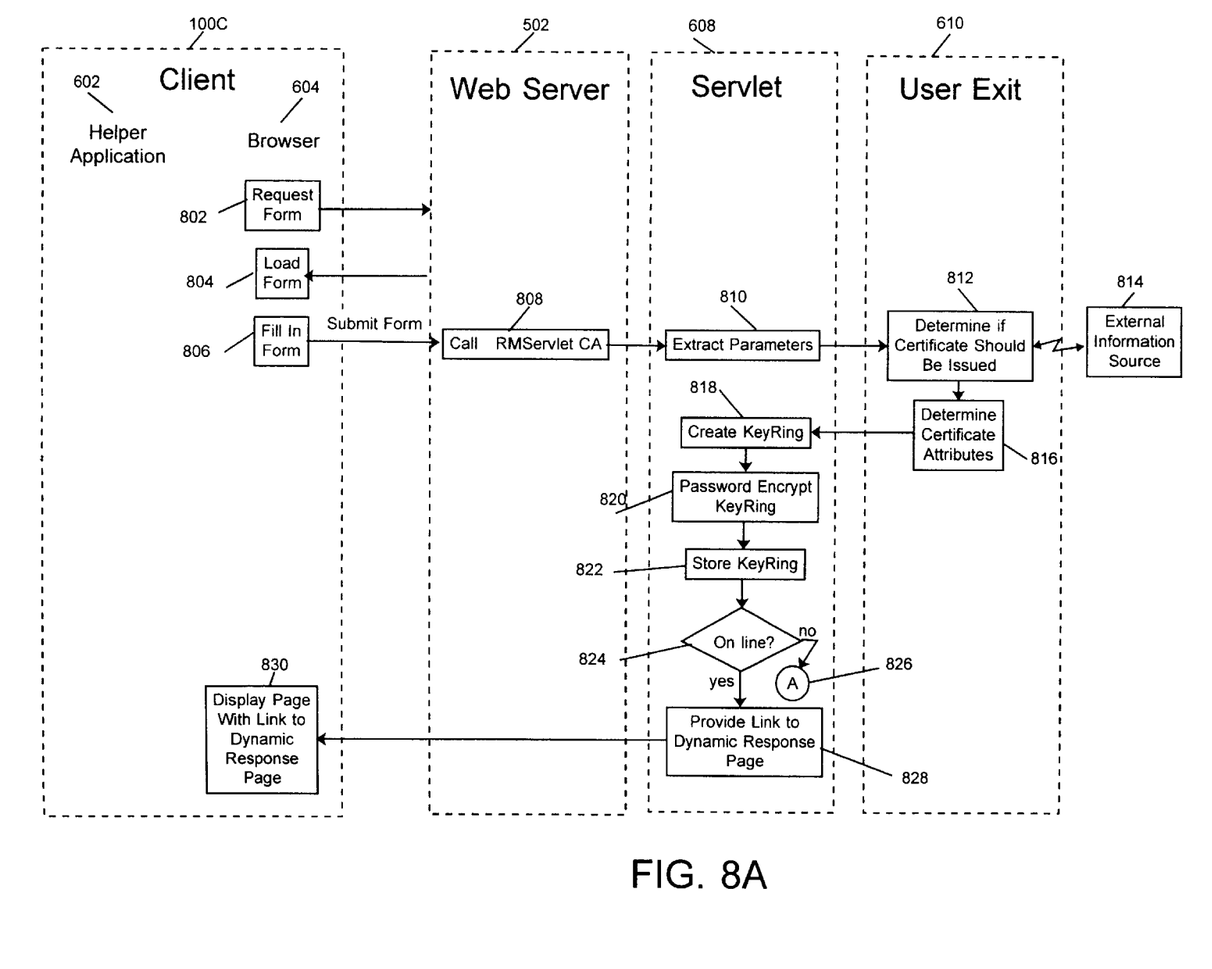
FIGS. 8A–8C are flow diagrams showing additional detail of the exemplary process steps used to issue a digital certificate in an on-line and an off-line mode.
Figure 8B:
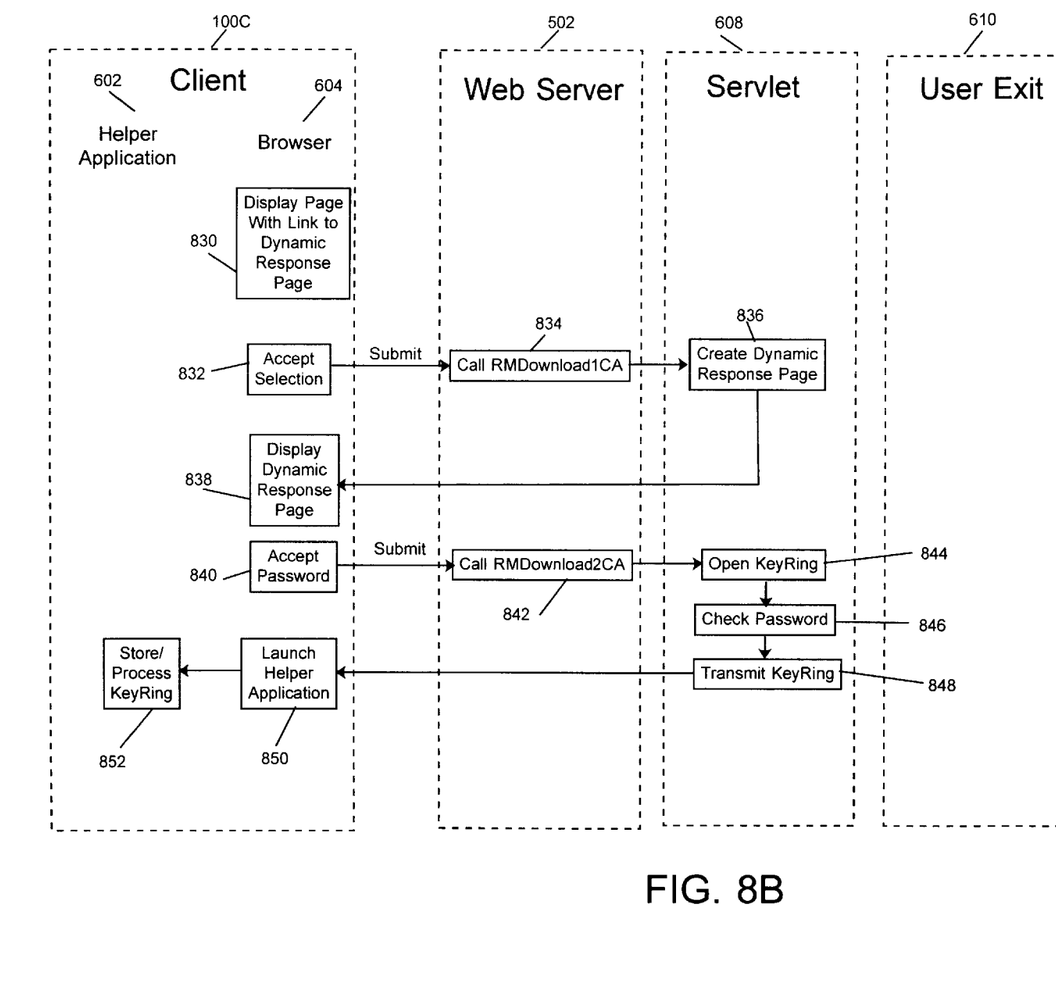
Figure 8C:
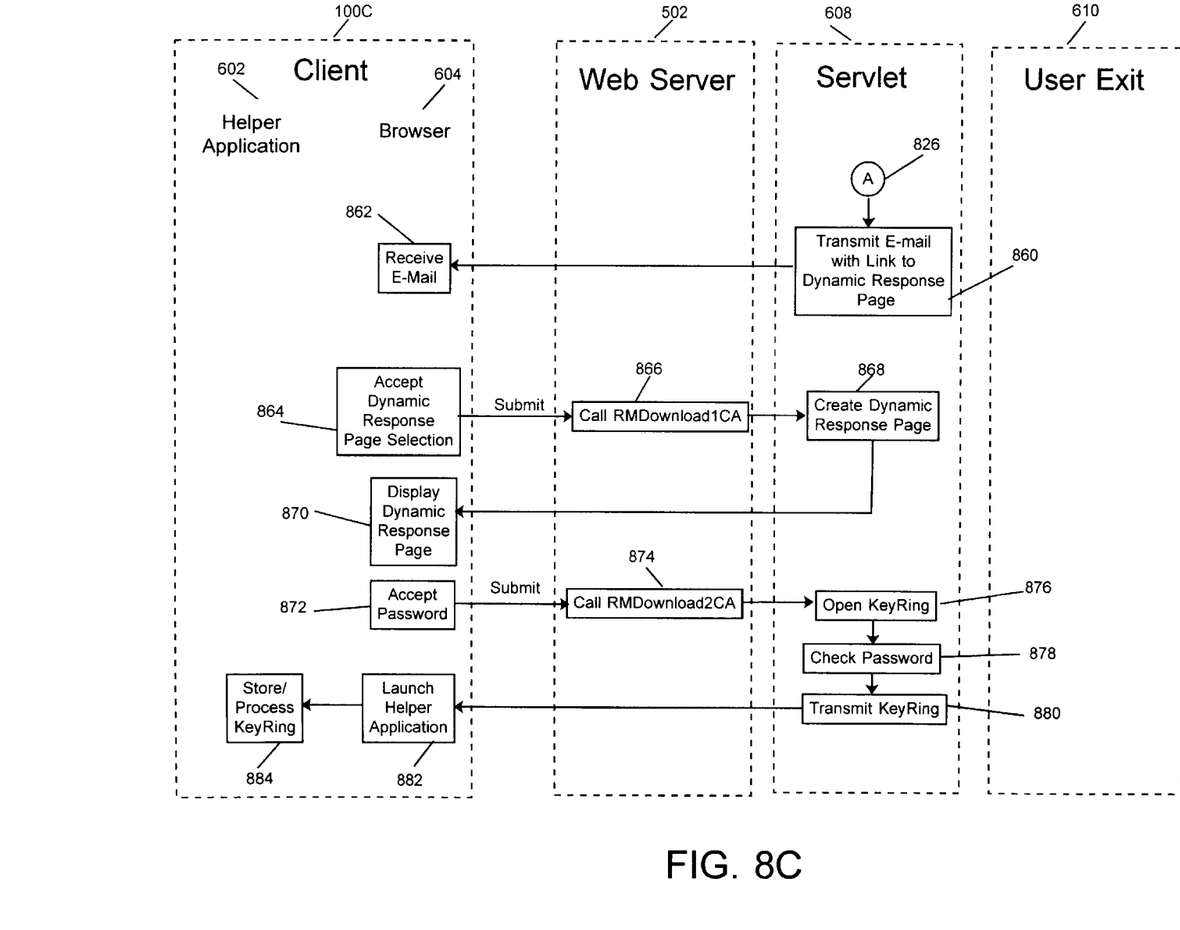

FIGS. 8A–8C are diagrams showing additional detail regarding the issuance of digital certificates. First, as shown in FIG. 8A, the client requests 802 a digital certificate request form 618A. Baseline digital certificate request forms may be provided to the digital certificate provider. Nominally, the request form has fields for entering client parameters such as the client's name and e-mail address, a customer number, or other information. If different or additional client parameters are desired, the digital certificate provider can easily modify forms to meet the provider's specific requirements. The web server 502 receives the request, and transmits the digital certificate request form to the client computer 100C. In one embodiment, the certificate request form 618A includes a field for entering a client password. The client computer 100C loads the form and displays it to a user. The user fills in the request form 806, and transmits the completed form to the web server 502. The web server 502 starts a first servlet routine 808 (denoted as RMServletCA) when the request form is posted. The first servlet routine reads and extracts 810 the client parameters, and hands them to a user exit 610, which will determine whether a digital certificate should be issued to the requesting client 100C.

The user exit 612 is programmed by the digital certificate provider, and can perform many functions. For example, the user exit 612 may examine a customer or client database to decide if a digital certificate will be issued. The user exit 612 may also determine that an external information source 814 must be contacted to provide additional information. Client parameters may be provided to the external information source 814 if necessary. The user exit 612 may also determine whether the digital certificate will be issued on-line or off line, based on the issuance policies implemented by the user exit 612 (i.e. if external information is required) or based upon an estimate of the time it will take to issue a certificate. An Interface 610 between the user exit 612 and the servlet 608 is provided by implementing a property file in the servlet 608. The property file comprises parameters such as the name of the CA 606 and the class name of the user exit. Thus, when the servlet 608 is called, the class names of the user exits are read and dynamically linked to. If the user exit 612 determines that the digital certificate will not be issued, it may also return a message indicating why the certificate was denied.

If a digital certificate should not be issued to the requesting client, the user exit provides this determination to the servlet 608, and this information is transmitted to the client 100C, either by posting a web page or by transmitting an electronic mail (e-mail) message to the client's address.

If a digital certificate should be issued, variable certificate attributes are determined 816 (fixed certificate attributes are normally determined by the servlet 608), and processing returns to the servlet 608. The servlet 608 first creates a key pair (including the client's public and private key), then a certificate (by signing the public key and its own private key) then adds its own root certificate, and puts these items together with the private key to build a key ring. The result is stored along with an associated URL 620 in the web server 502. Note that unlike ordinary schemes which require the client to pass a private key 204A to the certificate authority 606, the servlet 608 itself computes both the public and the private key, relieving the browser 604 or other software in the client computer 100C from doing so. Although this requires that the client trusts the CA not to use or disclose the private key, this is largely irrelevant for many applications. The CA 606 knows the private key of every client, and thus, the CA 606 would be capable of forging the signature of any client. However, the CA 606 is maintained by the digital library or retailer, and could only damage itself by doing so. By allowing the CA 606 to compute both the private and public keys, the computational burden is removed from the client, with minimal effective reduction in security.

The servlet 608 also creates a keyring for the client, as shown in block 818. The keyring organizes key pairs and certificates so that they may be easily stored and retrieved by applications running in the client computer 100C.

In one embodiment, the digital certificate request form 618 originally submitted by the client includes an area for inputting a client password. This client password may be used to encrypt the keyring or certificate before saving it in the web server 502, or transmitting it to the client computer 100C, thus providing additional security from interception by third parties. If a client password has been supplied, the key ring is encrypted 820 with the password and stored 822. Normally, the web server 502 does not retain a plaintext copy of the digital certificate or the client password. Since the user alone knows the password, the user's public and private keys, when stored in the web server 502, are secure.

As previously noted, the computation of the private and public keys for the client's digital certificate can be a time-consuming task. Further, if external information is required to decide whether to issue a digital certificate to the requesting client 100C, the time between the request and the availability of the digital certificate may be extensive, for reasons beyond the digital certificate provider's control. Hence, the elapsed time between the request for a digital certificate, and its computation may be fairly lengthy. To account for such delays, the present invention includes both on-line and off-line digital certificate capabilities. In the on-line mode, a link to a page where the digital certificate may be obtained (the dynamic response page) is provided 828 to the requesting client as soon as it becomes available, and the client remains on-line until that page is provided, and the client computer 100C then displays 830 that page. In the off-line mode, discussed further below with reference to FIG. 8C, the requesting client is permitted to go off-line, and an e-mail is sent to the client computer 100C with a reference to the dynamic response page with the digital certificate as soon as it becomes available.

FIG. 8B illustrates the process flow after the page with a link to the dynamic response page is displayed on the client computer's browser 604. The client can then request download of the digital certificate by selecting appropriate link to the dynamic response page.

The browser 604 accepts the selection of the link to the dynamic response page, and the completed form is submitted to the web server 502. When the web server 502 receives the link selection, it calls 834 a second servlet routine (denoted RMDownload1CA). The second servlet routine creates 836 the dynamic response page and provides the dynamic response page to the client 100C. In one embodiment, the dynamic response page also comprises a field to enter the client password. After the client 100C enters the client password and transmits the completed dynamic response page to the web server 502, the web server 502 calls a third servlet routine (denoted RMDownload2CA). The second servlet routine accepts the client password entered into the dynamic response page and uses the entered password to decrypt the client's keyring. If the entered password is the same as the client's password (which was used to encrypt the client's keyring), the decrypted keyring will include a valid certificate. If not, the "decrypted" keyring will be unintelligible. If the decrypted keyring includes a valid certificate, the plaintext (decrypted) version of the keyring is discarded, and the encrypted keyring is transmitted to the client as shown in blocks 844, 846, and 848. Hence, by using the entered password to "decrypt" the keyring encrypted with the client's password, and checking to see if the "decrypted" keyring is intelligible, the accepted password is essentially compared to the client's password, and the two must match before the encrypted keyring is transmitted to the client computer 100C.

When a web browser 604 receives a certificate, it normally stores it in its own certificate database, and does not make it available for other applications. However, other applications running on the client computer 100C may need certificate information. For example, the CRYPTOLOPE system available from the IBM Corporation requires access to the certificates. Accordingly, the certificates must be stored in a file so a helper application 602 like CRYPTO-LOPE may use them. To provide this capability, the keyring is returned to the client in a form (such as a MIME-type) that a standard web browser 604 will not recognize as a certificate. When the browser 604 receives the key ring and recognizes the data type, it starts a RMReceive routine in the helper application 602. The RMReceive routine transparently manages the keyrings in the client computer 100C. Before the keyring can be used, it must be decrypted by the user. This is accomplished by prompting the user to re-enter the client password, then using the password to decrypt the key ring. The RMReceive routine also looks for an existing private key ring in the client computer 100C. If an existing private keyring is found, RMReceive asks for the passwords to both the new keyring and the existing keyring. After the user successfully enters both passwords, the keyrings are merged together, and password encrypted (using either the password from the existing key ring, the new key ring, or a new password). This is depicted in blocks 850 and 852.

FIG. 8C is a diagram illustrating the off-line process flow. As described above, off-line processing will normally occur in situations where the CA 606 cannot respond with a digital certificate rapidly. This may occur when the CA 606 requires additional information from an external source in order to decide whether to grant the digital certificate, or in cases where the key digital certificate generation involves lengthy computation or communication times. Alternatively, off-line granting of a digital certificate may be selectively invoked by the requesting client 100C or the certificate authority 606. In the off-line processing case illustrated in FIG. 8C, the servlet 608 transmits 860 an e-mail with a link to the dynamic response page to the client 100C. The client 100C receives 862 the e-mail message, and presents the message to the user. In one embodiment, the e-mail includes a uniform resource locator (URL) of the web server 502 where the dynamic response page may be obtained. The URL may be plain text, or may be a hot link, allowing the user to select the dynamic response page by simply clicking on the URL text. In either case, when the user has selected the dynamic response page, a dynamic response page is created 868 by calling the second servlet routine, as described earlier with respect to FIG. 8B. A dynamic response page with a field for entering the client password is then displayed 870 by the browser 604. The browser 604 accepts the password entered by the user. The servlet 608 checks the password as described earlier (by attempting to use the entered password to decrypt the keyring), and if it matches the password previously entered by the user, the encrypted keyring is opened 846 and transmitted 848 to the client computer 100C. Upon receipt of the encrypted keyring, the browser launches 850 the helper application 602 (if it has not already been launched), and the helper application 602 stores and processes 852 the keyring as described earlier.

CONCLUSION

This concludes the description of the preferred embodiments of the present invention. In summary, the present invention describes a method, apparatus, and article of manufacture for issuing digital certificates.

The method comprises the steps of accepting a digital certificate request from a client in a web server, the digital certificate request comprising at least one client parameter, passing the client parameter to user exit external to the web server via an interface implemented by a servlet property file to determine if a digital certificate should be issued to the client, and transmitting the digital certificate to the client if the external processing module indicates that the digital certificate should be issued to the client. The article of manufacture comprises a data storage device tangibly embodying instructions to perform the method steps described above.

The apparatus comprises means for accepting a digital certificate request with a client parameter from a client in a web server, means for passing the client parameter to an external processing module to determine, among other things, if the digital certificate should be issued to the client, a means to create a certificate, and a means for transmitting the digital certificate to the client.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of issuing digital certificates, comprising the steps of:

accepting a digital certificate request from a client in a servlet implemented in a web server, the digital certificate request comprising at least one client parameter;

passing the client parameter to a user exit external to the servlet to determine if a digital certificate should be issued to the client; and transmitting the digital certificate to the client if the external processing module indicates that the digital certificate should be issued to the client.

2. The method of claim 1, wherein step of transmitting the digital certificate to the client comprises the steps of:

computing a private key and a public key for the client when user exit indicates that the digital certificate should be issued to the client;

preparing a digital certificate using the public key and the private key; and transmitting the digital certificate to the client.

3. The method of claim 2, wherein the private key and the public key are computed in the servlet.

4. The method of claim 2, wherein the digital certificate request further comprises a client password, and the step of transmitting the digital certificate to the client further comprises the steps of:

encrypting the digital certificate with the client password; and transmitting the encrypted digital certificate to the client.

5. The method of claim 4, wherein the step of transmitting the digital certificate to the client comprises the steps of:

providing a link to a response page to the client, the response page comprising an entry field for accepting an entered password;

transmitting the response page to the client when the link to the response page is selected;

receiving the entered password from the client; and transmitting the encrypted digital certificate to the client when the entered password matches the client password.

6. The method of claim 5, wherein the link to the response page is provided by transmitting an e-mail having a link to the response page to the client.

7. The method of claim 5, wherein the step of transmitting the encrypted digital certificate to the client when the entered password matches the client password comprises the steps of:

decrypting the digital certificate with the entered password; and transmitting the encrypted digital certificate to the client when the decrypted digital certificate is a valid certificate.

8. An apparatus for issuing digital certificates, comprising:

means for accepting a digital certificate request from a client in a servlet implemented in a web server, the digital certificate request comprising at least one client parameter;

means for passing the client parameter to a user exit external to the servlet to determine if a digital certificate should be issued to the client; and means for transmitting the digital certificate to the client if the external processing module indicates that the digital certificate should be issued to the client.

9. The apparatus of claim 8, wherein means for transmitting the digital certificate to the client comprises:

means for computing a private key and a public key for the client when user exit indicates that the digital certificate should be issued to the client;

means for preparing a digital certificate using the public key and the private key; and means for transmitting the digital certificate to the client.

10. The apparatus of claim 9, wherein the private key and the public key are computed in the servlet.

11. The apparatus of claim 9, wherein the digital certificate request further comprises a client password, and the means for transmitting the digital certificate to the client further comprises:

means for encrypting the digital certificate with the client password; and means for transmitting the encrypted digital certificate to the client.

12. The apparatus of claim 11, wherein the means for transmitting the digital certificate to the client comprises:

means for providing a link to a response page to the client, the response page comprising an entry field for accepting an entered password;

means for transmitting the response page to the client when the link to the response page is selected;

means for receiving the entered password from the client; and means for transmitting the encrypted digital certificate to the client when the entered password matches the client password.

13. The apparatus of claim 12, wherein the link to the response page is provided by transmitting an e-mail having a link to the response page to the client.

14. The apparatus of claim 12, wherein the means for transmitting the encrypted digital certificate to the client when the entered password matches the client password comprises:

means for decrypting the digital certificate with the entered password; and means for transmitting the encrypted digital certificate to the client when the decrypted digital certificate is a valid certificate.

15. A program storage device, readable by a computer, tangibly embodying at least one program of instructions executable by the computer to perform method steps of issuing digital certificates, the method comprising the steps of:

accepting a digital certificate request from a client in a servlet implemented in a web server, the digital certificate request comprising at least one client parameter;

passing the client parameter to a user exit external to the servlet to determine if a digital certificate should be issued to the client; and transmitting the digital certificate to the client if the external processing module indicates that the digital certificate should be issued to the client.

16. The program storage device of claim 15, wherein method step of transmitting the digital certificate to the client comprises the method steps of:

computing a private key and a public key for the client when user exit indicates that the digital certificate should be issued to the client;

preparing a digital certificate using the public key and the private key; and transmitting the digital certificate to the client.

17. The program storage device of claim 16, wherein the private key and the public key are computed in the servlet.

18. The program storage device of claim 16, wherein the digital certificate request further comprises a client password, and the method step of transmitting the digital certificate to the client further comprises the method steps of:

encrypting the digital certificate with the client password; and transmitting the encrypted digital certificate to the client.

19. The program storage device of claim 18, wherein the method step of transmitting the digital certificate to the client comprises the method steps of:

providing a link to a response page to the client, the response page comprising an entry field for accepting an entered password;

transmitting the response page to the client when the link to the response page is selected;

receiving the entered password from the client; and transmitting the encrypted digital certificate to the client when the entered password matches the client password.

20. The program storage device of claim 19, wherein the link to the response page is provided by transmitting an e-mail having a link to the response page to the client.

21. The program storage device of claim 19, wherein the method step of transmitting the encrypted digital certificate to the client when the entered password matches the client password comprises the method steps of:

decrypting the digital certificate with the entered password; and     transmitting the encrypted digital certificate to the client when the decrypted digital certificate is a valid certificate.

\* \* \* \* \*